United States Patent Office 3,182,059
Patented May 4, 1965

3,182,059
METHOD OF PREPARING HALOGENOMETHYL-
ATED DERIVATIVE OF α,β-(ARYLOXAZOLYL-
(2))-ETHYLENE-ONIUM COMPOUND
Kenzo Konishi, Nishinomiya, Minoru Furukawa,
Kawachi, and Masatoshi Hirano, Ibaraki, Japan,
assignors to Daito Chemical Industry Company,
Limited, Daito, Japan, a juridical person under the
law of Japan
No Drawing. Filed Dec. 27, 1962, Ser. No. 247,529
Claims priority, application Japan, Dec. 29, 1961,
36/48,289
1 Claim. (Cl. 260—240)

This invention relates to the production of optical brightening agents. More particularly, the invention pertains to the method of preparing mono- and dihalogenomethylated derivatives of α,β-bis-(aryloxazolyl-(2))-ethylene-onium compounds and the double salts of said derivatives having the formula:

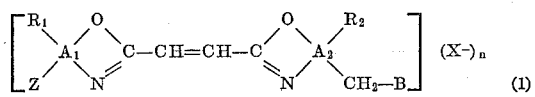
(1)

wherein $A_1$ and $A_2$ are respectively a benzene or naphthalene nucleus; each of $R_1$ and $R_2$ stands for a hydrogen atom, a methyl or an ethyl group; Z is a hydrogen atom or —$CH_2B$; B is an onium salt-forming compound residual radical; X is a halogen atom; and $n$ is an integer from 1 to 2, namely 1 when Z is a hydrogen atom, and 2 when Z is —$CH_2B$.

The brightening agents of this invention can be applied to a wide variety of materials as will be specified later, producing a marked fastness to light and washing that has never been attained in the art.

In accordance with the method of the invention, the first stage thereof comprises reacting α,β-bis-(aryloxazolyl-(2))-ethane having the formula:

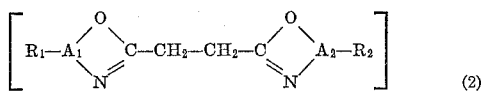
(2)

wherein $A_1$, $A_2$, $R_1$ and $R_2$ are defined as above, with formaldehyde gas or an aqueous solution thereof or a formaldehyde-forming compound, such as paraformaldehyde, in the presence of sulfuric acid and chlorosulfonic acid at 20° to 80° C., to introduce one halogenomethyl group into one or each of the $A_1$ and $A_2$ rings, yielding a halogenomethylated ethane compound having the formula:

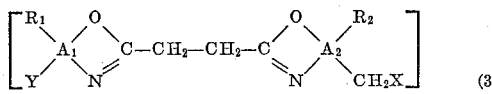
(3)

wherein $A_1$, $A_2$, $R_1$ and $R_2$ are defined as above; Y is a hydrogen atom or —$CH_2X$, and X is a halogen atom. The starting material may be reacted with dihalogenomethyl ether in the presence of a dehydrating agent, such as sulfuric acid or zinc chloride, at said temperature.

In said halogenomethylating reaction, one halogenomethyl group is introduced into one of the aryl nuclei when one mol of the starting material is reacted with about one mole of formaldehyde or dihalogenomethyl ether, and each of the aryl nuclei is halogenomethylated with one halogenomethyl group when about 2 mols of the reactant are employed in relation to one mol of the starting material. But it is impossible to introduce more than one halogenomethyl group into each of the aryl nuclei even when more than 2 mols of the reactant are employed in relation to one mol of the starting material.

The halogenomethylating reaction is accelerated when hydrogen halide is coemployed, particularly when a salt, such as sodium chloride which decomposes easily with acid, is added so as to utilize the hydrogen halide gas generated in the reaction system by the action of sulfuric acid or chlorosulfonic acid.

The second stage of the method of this invention comprises oxidizing the halogenomethylated ethane compound with a mild oxidant in the medium of water or an organic solvent. The oxidants employed in the invention are active chlorine-forming compounds, such as chlorine, thionyl chloride and sulfuryl chloride which are employed in the presence of a slight amount of iodine; and hydrogen peroxide, mercuric acetate, mercuric oxide and nitrobenzene.

The oxidizing reaction is carried out at 50° to 150° C. with, for instance, mercuric oxide in the presence of acetic acid in an inactive organic solvent, such as dichlorobenzene or trichlorobenzene, or with chlorine gas in the presence of a slight amount of iodine, yielding a compound having an ethylene bond.

The third stage of the method of this invention consists of reacting the halogenomethylated ethylene compound with an onium salt-forming organic nitrogen compound, such as pyridine, picoline, lutidine or trialkylamine, to replace the halogenomethyl group with an onium salt substituent. For instance, the addition reaction of a dihalogenomethyl compound with pyridine produces a novel optical brightening agent of the invention having the formula:

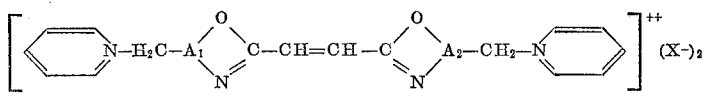

The resultant compound can be converted with a slight loss into a double salt when mixed in an aqueous solution of zinc chloride.

The brightening agents, including the double salts, of this invention have an excelled water solubility. The agents can all be applied in the state of an aqueous solution to the fibrous materials made of polyacrylonitrile and its copolymers, polyamide, polyolefine, polyvinylacetal, cellulose acetate, viscose rayon, cotton and other synthetic, artificial and natural fibers, producing marked brightening effects. Particularly, that the optical brightening of polyacrylonitrile which has hardly been carried out in the prior art can be easily performed in the invention is one of the pronounced features of the same.

The fibrous materials to be optically brightened are dipped in an aqueous solution of the agents of this invention adjusted to pH 2 to 10. The temperature used ranges from room temperature to 130° C., the pH value and the temperature being adjusted in accordance with the variety of the fibrous materials to be optically brightened. The fibrous materials can also be impregnated with the solution and then steam-heated. The dipping period is 30 minutes or thereabout. To adjust the pH, an organic or inorganic acid or acid salt is added.

In the present invention, satisfactory brightening effects can be obtained in the order of 0.001 weight percent in terms of the aqueous solution. Excess amounts do not necessarily augment the brightening effects. Being water soluble, the brightening agents of this invention can be dissolved without the use of a dispersing agent which is the case with the conventional optical brightening agents. The impregnating ability and the fastness to light and washing of the agents of this invention are also excelled.

The brightening agents of this invention can all be employed prior to, posterior to, or simultaneously with the dyeing, bleaching, rinsing and other processing.

Preferred examples are as follows:

Example 1

To 467 grams of 98% sulfuric acid were added 36 grams of paraformaldehyde. The mixture was cooled to 10° C. with ice water, and 292 grams of chlorosulfonic acid were added dropwise. Stirring was continued until the paraformaldehyde dissolved completely.

To the resultant mixture were added 29.2 grams of α,β-bis-(5-methylbenzoxazolyl-(2))-ethane and then 58.4 grams of sodium chloride with stirring for 48 hours at 45° to 50° C. The resulting reaction mixture was poured into ice water, and the precipitates were filtered, washed with water and dried, yielding white crystals having the formula:

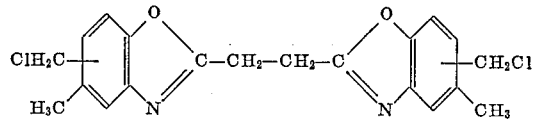

In 175 grams of glacial acetic acid were then dissolved 35 grams of said compound, decolorized with 3.5 grams of active carbon, and filtered while hot. To the resultant filtrate were added 34.6 grams of mercuric acetate with stirring at 25° to 30° C., heated at 80° C. for 3 hours, and filtered while hot. The precipitating mercury was separated by filtration, and the filtrate was distilled under reduced pressure to remove the acetic acid. The residue was then filtered, extracted with monochlorobenzene, and decolorized with active carbon. To the extracted liquor were added 98 grams of pyridine, stirred at 80 C. for 24 hours, and the precipitates were filtered, washed with monochlorobenzene and then benzene, and dried, yielding 27.5 grams of yellow crystals having the formula:

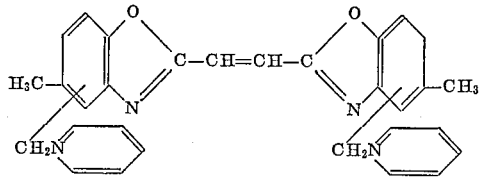

The above product can be easily refined when dissolved in methanol and then recrystallized with acetone and refined, or can be almost theoretically converted into light yellowish crystals of double salts when dissolved in water, decolorized and reacted with an aqueous solution of 50 weight percent of zinc chloride added dropwise.

32 grams of α,β-bis-(5-ethylbenzoxazolyl-(2))-ethane and 27.8 grams of α-5-methylbenzoxazolyl-β-benzoxazolyl-(2)-ethane employed in the place of 29.2 grams of α,β-bis-(5-methylbenzoxazolyl-(2))-ethane produced respectively 38.0 and 32.2 grams of the desired dichloromethyl compound.

Example 2

In 350 grams of monochlorobenzene were dissolved with heat 35 grams of the chloromethyl compound prepared in accordance with Example 1, decolorized with 3.5 grams of active carbon, and filtered while hot. To the resultant filtrate was added 0.5 gram of iodine, and then 10 grams of chlorine gas were bubbled at 125° to 130° C. for 30 minutes. Stirring was continued at said temperature for 15 minutes. The mixture was cooled to 80° C., and 100 grams of picoline were added with stirring for 24 hours. The resulting yellow crystals were filtered, washed with monochlorobenzene and then benzene, and dried, yielding 43 grams of yellow crystals.

31.6 grams of α,β-bis-(chloromethylbenzoxazolyl-(2))-ethane employed as a chloromethyl compound and 16.5 grams of sulfuryl chloride used as an active chlorine-forming compound were reacted as above, yielding yellow crystals having the formula:

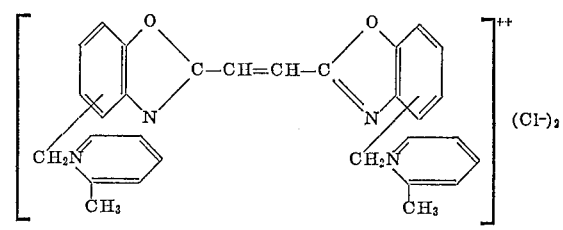

What we claim is:

A process for producing a halogenomethylated derivative of α,β-(aryloxazolyl-(2))-ethylene-onium salt having the formula:

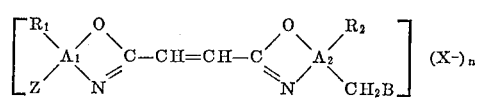

wherein each of $A_1$ and $A_2$ is a member selected from the group consisting of benzene and naphthalene nuclei; each of $R_1$ and $R_2$ is a member selected from the group consisting of hydrogen, methyl and ethyl; Z is a member selected from the group consisting of hydrogen and —$CH_2B$; B is a residual radical selected from the group consisting pyridine, picoline, lutidine and trialkylamine; X is a halogen atom, and n is a positive integer of up to 2 which comprises oxidizing at a temperature of between 50 and 150° C. a halogenomethylated compound having the formula:

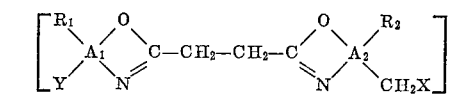

wherein $A_1$, $A_2$, $R_1$, $R_2$ and X are defined as above, and Y is a member selected from the group consisting of hydrogen and —$CH_2X$, with a member selected from the group consisting of (a) an active chlorine-forming substance selected from the group consisting of chlorine, thionylchloride and sulfuryl chloride in the presence of a catalytic amount of iodine, and (b) a member selected from the group consisting of hydrogen peroxide, mercuric acetate, mercuric oxide and nitrobenzene, thereby producing a chloromethyl ethylene compound of the formula:

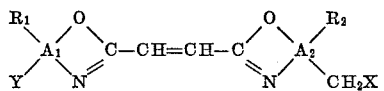

wherein $A_1$, $A_2$, $R_1$, $R_2$, Y and X are defined as above, then reacting at a temperature of about 80° C. said chloromethyl ethylene compound with an onium salt-forming compound selected from the group consisting of pyridine, picoline, lutidine and trialkylamine.

References Cited by the Examiner

UNITED STATES PATENTS 2,483,392 10/49 Meyer et al. _____ 260—240
2,765,303 10/56 Kovacic _____ 260—240

FOREIGN PATENTS 1,277,168 10/61 France.

IRVING MARCUS, *Primary Examiner.*

NICHOLAS S. RIZZO, *Examiner.*